April 7, 1959  S. J. GARTNER  2,880,550
BULB ROLLING MACHINE

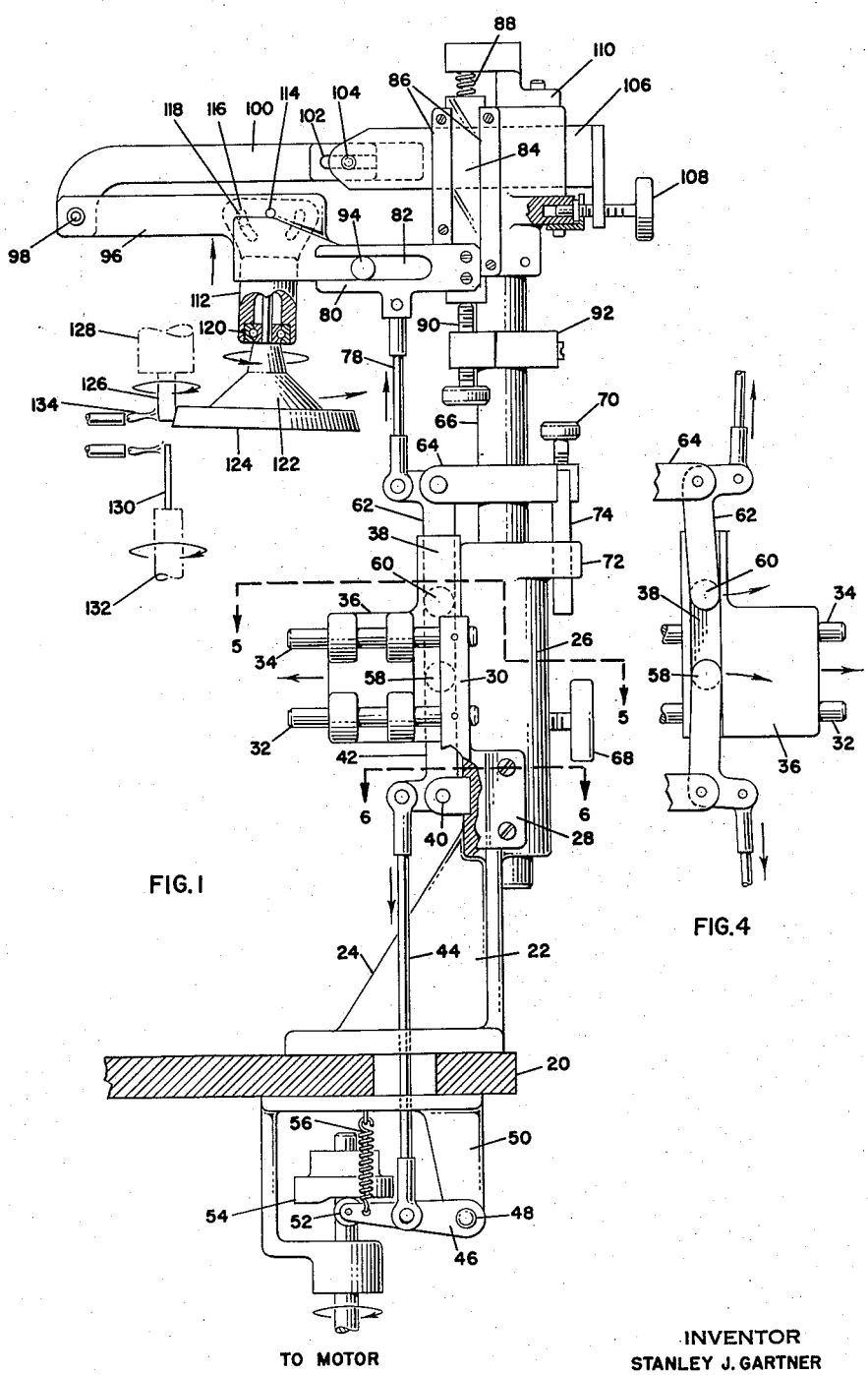

Filed June 30, 1955  3 Sheets-Sheet 2

INVENTOR
STANLEY J. GARTNER
BY *Michael Hertz*
ATTORNEY

April 7, 1959 S. J. GARTNER 2,880,550
BULB ROLLING MACHINE
Filed June 30, 1955 3 Sheets-Sheet 3

INVENTOR
STANLEY J. GARTNER though in plastic state, is formed on the surface of the bulb. Before dealing with the particular discs at each station, it might be well to consider the action involved in the sequence of discs.

2,880,550

BULB ROLLING MACHINE

Stanley J. Gartner, Emporium, Pa., assignor to Sylvania Electric Products Inc., a corporation of Massachusetts Application June 30, 1955, Serial No. 519,190

5 Claims. (Cl. 49—7)

This invention relates to mechanism for forming glass bulbs out of glass tubing and to means for providing these bulbs with exhaust tubulation, the product being utilizable in the manufacture of electron tubes. During such manufacture a bulb and its associated tubulation is assembled with a glass wafer which has electrical leads through the wafer and which has an electrode assembly mounted on the leads. After assembly, the bulb is sealed to the wafer, and after exhausting the tube and other operations, the tubulation is sealed off at the bulb.

In the prior art it had been customary to have the bulbs made on one machine and the tubulation attached to the bulbs on another machine. On the second machine a hole is pierced by hot pin flames through the bulb so that the bore of the tubulation would communicate with the space within the bulb. Furthermore, the usual procedure in forming bulbs had been by heating an intermediate section of a glass tube, drawing the adjacent portions apart while severing the section at the headed section and then, either by application of heat and gravity or by heating and pressure applied to the proximate ends of the portions axially of the tube, forming bulb ends on the tube portions.

It is an object of the present invention to form domed ends on glass tubing, by gradually molding in the wall at the end of the tubing to form a dome at the end of said wall, while the tubing adjacent the end is in a plastic state, the molding being effected by forces applied both longitudinally of the tubing and perpendicularly of the wall, as it changes inclination with respect to the axis of the tubing.

It is also an object of this invention to fuse a smaller glass tube to the dome of the glass tubing after the final stage of dome forming to provide the tubulated bulb, the dome for this purpose not being completely closed to facilitate attachment of the tubulation.

These and other objects will become apparent after reading the following specification and claims when taken in conjunction with the accompanying drawings in which:

Fig. 1 is a side elevational view of a bulb former at one of the stations of the machine.

Fig. 4 is a reverse side view of a portion of the former.

Figure 3:
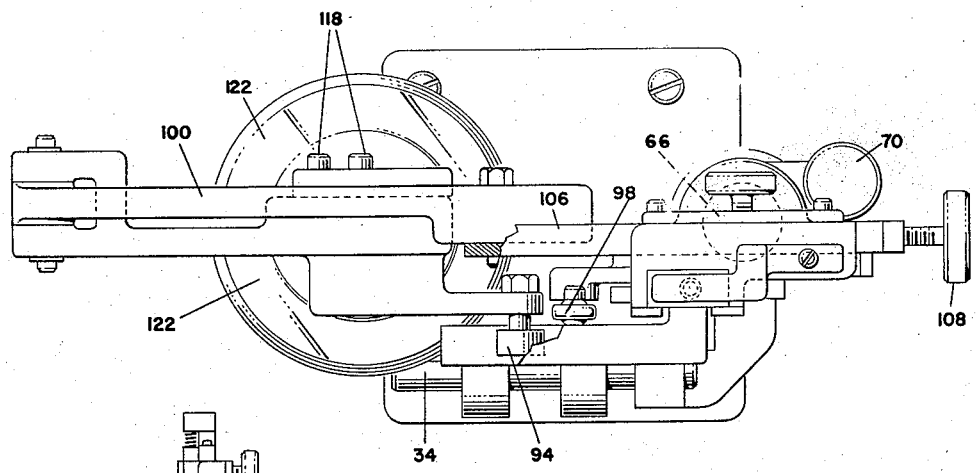
Fig. 3 is a top view of the former.
Figure 2:
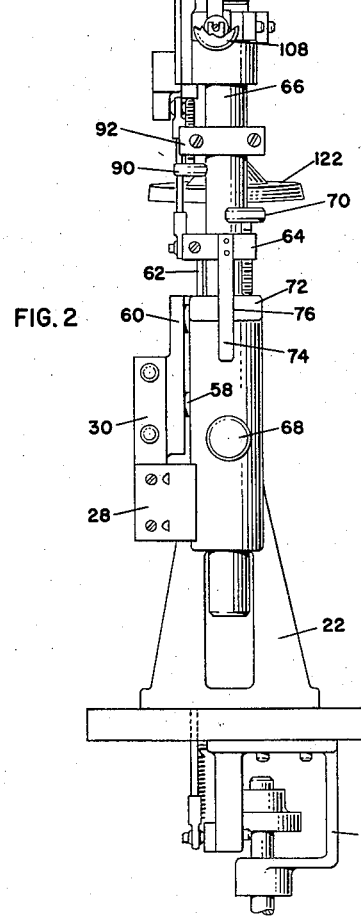
Fig. 2 is a rear view of the former.
Figure 5:
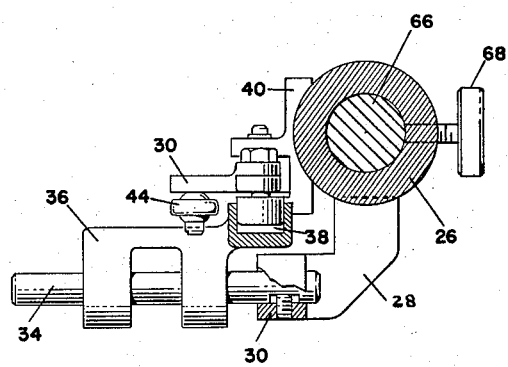
Fig. 5 is a section on the line 5—5 of Fig. 1.
Figure 6:
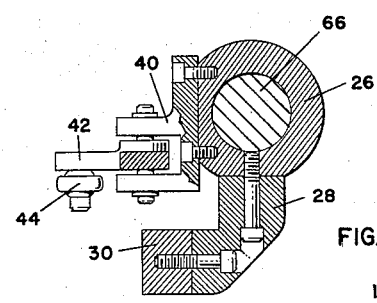
Fig. 6 is a section on the line 6—6 of Fig. 1.

Referring to the drawings in greater detail, at 20 there is indicated a table portion of the machine supporting an angle 22, reinforced by a gusset 24. Integral with the vertical member of the angle 22 is a sleeve 26 which has secured to it, against a flattened portion of the sleeve, an angle bracket 28. This angle bracket in turn is fastened to an upright 30 fixedly mounting two parallel horizontal rods 32, 34 one above the other. Slidable on these rods is a carriage 36, the carriage being provided with a vertical channel or guideway 38. Mounted on another flat portion of the sleeve 26 is a forked bracket 40, pivotally mounting a bell crank lever 42 which may be oscillated by reciprocatable movement of a link 44, connected to a second link 46 pivoted at one of its ends, as 48, to a hanger 50 fastened to the table 20 and provided at its other end with a cam follower 52 cooperative with a face of a cam 54 to depress the link 46 to lower the link 44. There is also provided a spring 56 fixed at one end to the hanger and at its other end to the link 46 to raise the links 46 and 44. Movement of the link 44 oscillates the bell crank 42, as will be apparent. The upper free end of the bell crank is provided with a roller 58 riding in the guideway 38 and operative to shift the carriage 36 back and forth on the rods 32 and 34.

Cooperative with the same guideway 38 is the follower roller 60 of an upper bell crank lever 62 pivoted on a collar 64 through which freely extends a shaft 66 held in adjusted vertical and rotational position in the sleeve 26 by a thumb screw 68. The collar may be adjusted in height by means of a screw 70 threaded through the collar and bearing on the upper end of a lateral projection 72 extending from the sleeve 26. To guide the collar 64 in its up and down motion and to keep the collar from rotating around the sleeve 26, there is attached thereto a square spline 74 movable through a closely fitting slot 76 in the projection 72.

The bell crank 62 has pivoted to it the link 78, pivoted at its upper end to a bar 80 having a horizontal slot 82 therein. The bar 80 is guided for vertical movement by means of a slide 84 rigidly fixed to the bar 80 and movable in ways 86, and spring pressed by means of a spring 88 to cause the slide to move against a stop 90 threaded through a split collar 92 fast on the shaft 66. The spring 56 serves to urge slide 36 to the right in Fig. 1, such movement being assisted by the spring 88.

Within the slot 82 is a cam follower 94 on the free end of an arm 96, pivoted at 98 to a cantilever beam or support 100, roughly longitudinally telescopically adjustable, by means of slot and bolt 102 and 104, the slot being in the bar 100. The bolt is held in a recessed bar 106, the bar 106 being finely longitudinally adjustable by screw means 108 in a head 110 mounted on the upper end of shaft 66.

The arm 96 supports a depending bearing member 112, which may be adjusted at will about a pivot 114 to a desired angle by means of arcuate guide slots 116 and clamp screws 118. The bearing member has non-friction bearings 120 freely rotatably mounting a moulding disc, such as disc 121 in Fig. 7 or disc 122 in Figs. 1 and 8.

The periphery 124 of the disc illustrated in Fig. 1, it will be noted, has a slight angularity with respect to the axis of rotation of the disc. This angle varies with the discs at the discs at the different stations as will be described.

The glass tubing to be formed into a bulb is held in a rotating chuck 128 mounted on an indexible turret and movable through the several stations while the tubulation 130 which is to be fused onto a formed bulb is held in a companion chuck 132 rotatable with the turret and with the chuck 128, as is conventional practice in the art.

The various adjustments previously described are coarse and fine adjustments, all contributing to proper positioning of the discs, the proper amount of swing, and the preliminary and final angular positions of the discs. Initially the discs are positioned but a slight distance from the tubing and are brought up against the tubing by spring action, the cams 54 at each station serving to restore the discs to normal retracted position. As a disc comes into contact with a chuck rotated, heat softened, glass tubing, it is set into rotation by frictional contact with the exterior surface of the tubing.

Figures 7, 8, 9:
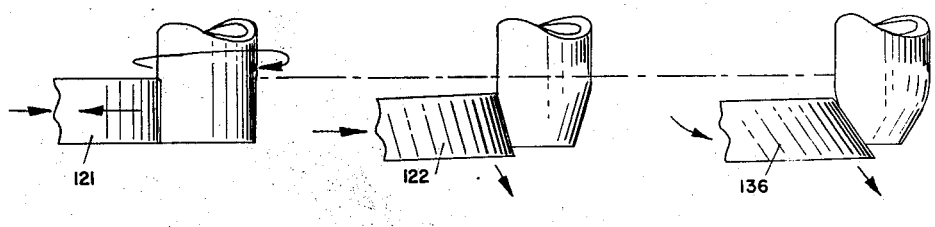
Figs. 7 to 13 are diagrammatic views showing the action of a series of glass shaping and drawing rolls which may be utilized in the conversion of a glass tube to a tubulated bulb.

At the first station, see Fig. 7, the disc 121 has a wider peripheral face as measured axially of the disc than the other discs. The peripheral face is preferably perpendicular to the disc and the disc moves bodily but a small distance laterally of the glass tubing. Since there is but slight lateral displacement of the disc 121, the disc merely presses against the exterior of the glass tubing as it is being softened by the gas flames 134 and causes it to shrink in diameter if the glass tubing be oversize. The effect of this first disc is to bring all tubing to approximately the same interior diameter since the wall thickness of the tubing varies very little although the inner and outer diameters may vary to some extent. Also the shrinking in of the end portions of the tubing provides a peripheral seat for an insulator spacer disc inside of the tubing and subsequently formed bulb.

The second disc 122 has a peripheral surface at a marked angle to the disc axis and is also mounted, by appropriate adjustment of parts, to have a greater angle of swing than the disc 121. As a result, the disc 122 has, at the peripheral face, a component of motion radially of the tubing and a downward component. These motions serve not only to force the free end of the tubing inwardly but also to draw the glass slightly.

Figures 10, 11, 12, 13:
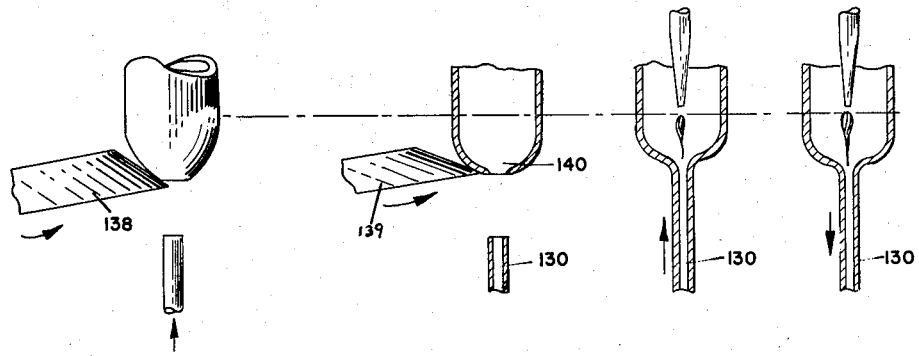

The third and subsequent discs 136, 138, and 139 have progressively still greater angularity and greater degrees of swing, if desired, than the second disc. Although five discs are illustrated, it is obvious that the number will vary depending, for example, on the original diameter of the tubing, the angularity of the several peripheral faces on the discs, and the amount of swing as determined by the stop 90 and other adjustments. In the last stage, it is preferable to leave a small opening in the bulb as opening 140 so as to facilitate attachment of the tubulation 130 as it is brought up into fusing relationship with the bulb as illustrated in Fig. 12 and subsequently puddled downward as illustrated in Fig. 13, this puddling being old in the art. The preliminary bore 140 in the bulb facilitates maintaining the interior of the bulb open to the tubulation during the tubulation attaching and puddling operation.

Having thus described my invention, what is claimed as new is:

1. In a bulb forming machine, a vertical post, a cantilever beam on said post, an arm pivoted to the free end of the beam and extending toward the post, a rotatable disc depending from said arm and mounted on a vertical axis in said arm intermediate the ends thereof, and means for oscillating the free end of the arm.

2. In a bulb forming machine, a vertical post, a cantilever beam on said post, an arm pivoted to the free end of the beam and extending toward the post, a freely rotatable disc depending from said arm and mounted on a vertical axis in said arm intermediate the ends thereof, yielding means for moving the free end of the arm from a first position downwardly about its pivot, and means for restoring the arm to its first position.

3. In a bulb forming machine, a vertical post, a cantilever beam on said post, an arm pivoted to the free end of the beam and extending toward the post, a freely rotatble disc depending from said arm and mounted on a vertical axis in said arm intermediate the ends thereof, yielding means for moving the free end of the arm from a first position downwardly about its pivot, means for restoring the arm to its first position, and means for adjustably limiting the downward movement of the arm.

4. In a bulb forming machine, a vertical post, a cantilever beam on said post, means for adjusting the length of said cantilever beam, an arm pivoted to the free end of the beam and extending toward the post, a freely rotatable disc depending from said arm and mounted on a vertical axis in said arm intermediate the ends thereof, and means for oscillating the free end of the arm.

5. In a bulb forming machine, a vertical post, a cantilever beam on said post, an arm pivoted to the free end of the beam and extending toward the post, a freely rotatable disc depending from said arm and mounted on a vertical axis in said arm intermediate the ends thereof, a cam follower on the free end of the arm, a vertically movable horizontal trackway slidable on said post, receiving said follower, a link depending from said trackway, a bell crank fixedly mounted on said post and connected at one end to the lower end of said link, a second cam follower on the lower end of the bell crank, a vertical trackway receiving said second cam follower said trackway being slidable laterally relative to and supported by said post, a third cam follower in said vertical trackway said third cam follower being mounted on an end of a second bell crank pivotally mounted on the post, a second link depending from the other end of the second bell crank, the lower end of said second link being connected to an intermediate portion of a lever fixed at one end and having a fourth cam follower at its other end, and cam and spring means for vertically oscillating said cam follower.

References Cited in the file of this patent

UNITED STATES PATENTS

| | | |
|---|---|---|
| 1,425,606 | Quackenbush | Aug. 15, 1922 |
| 1,914,205 | Hooper et al. | June 13, 1933 |
| 2,266,417 | Eisler | Dec. 16, 1941 |
| 2,447,568 | Eisler | Aug. 24, 1948 |
| 2,469,681 | Coby | May 10, 1949 |
| 2,475,915 | Orr | July 12, 1949 |
| 2,503,140 | Stookey | Apr. 4, 1950 |
| 2,507,300 | Everett | May 9, 1950 |